(No Model.) 7 Sheets—Sheet 1.

J. R. WILLIAMS.
TOBACCO STRIPPING AND BOOKING MACHINE.

No. 500,647. Patented July 4, 1893.

WITNESSES:
William Goebel
Ed. D. Miller

INVENTOR
John R. Williams,
BY
Chas. C. Gill
ATTORNEY.

(No Model.) 7 Sheets—Sheet 2.

J. R. WILLIAMS.
TOBACCO STRIPPING AND BOOKING MACHINE.

No. 500,647. Patented July 4, 1893.

WITNESSES:
William Goebel
Ed. D. Miller

INVENTOR
John R. Williams,
BY
Chas. O. Gill
ATTORNEY.

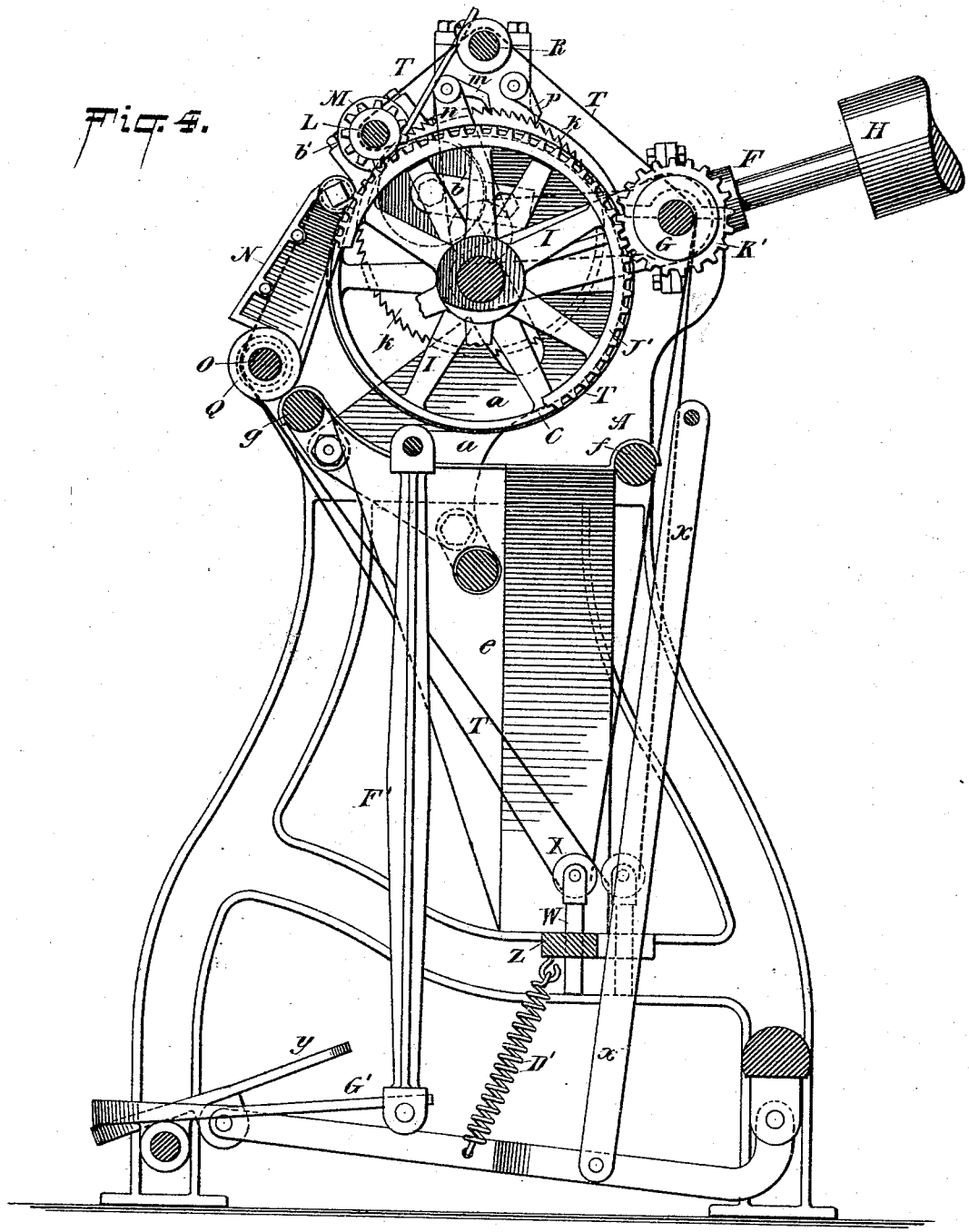

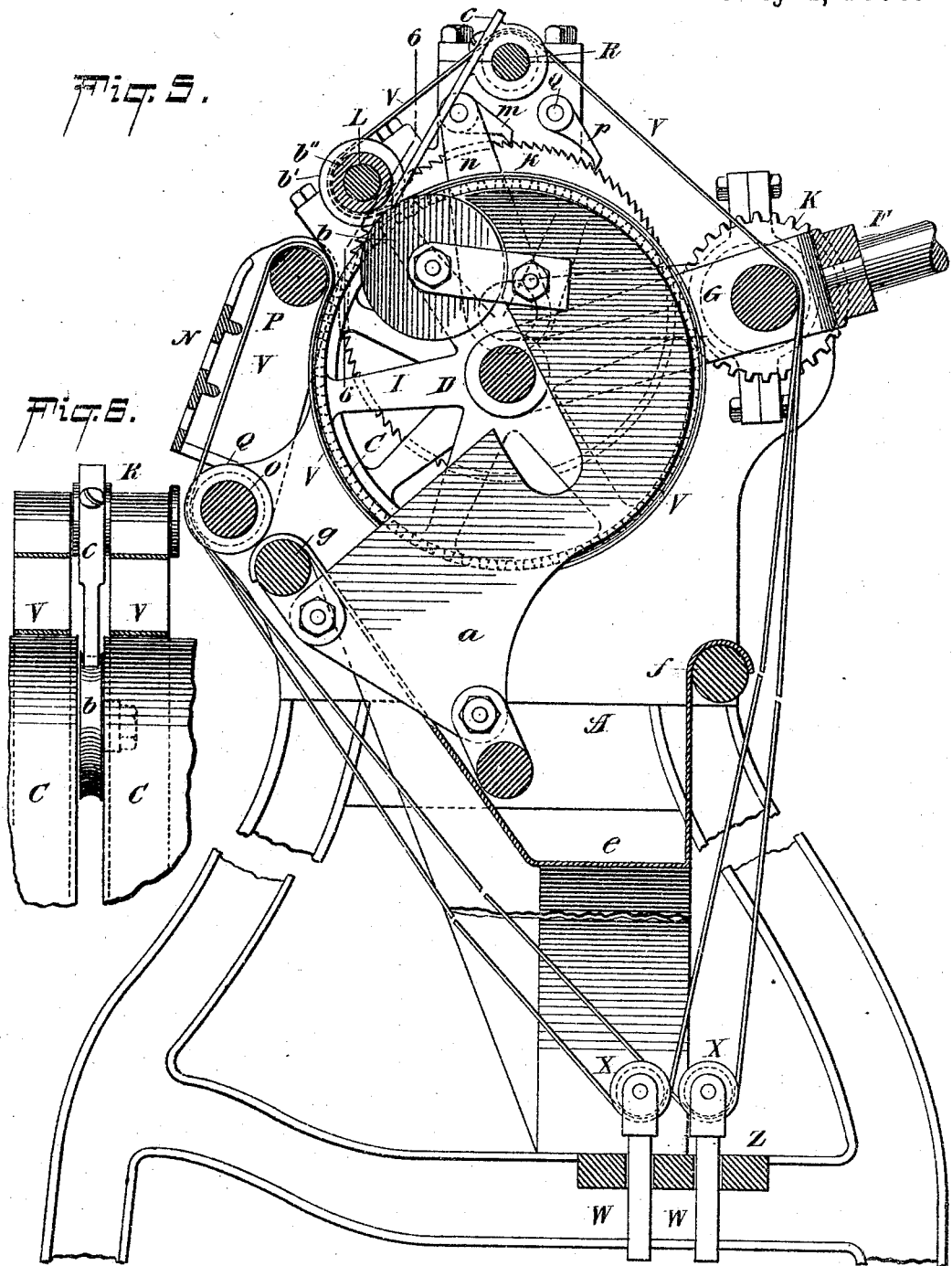

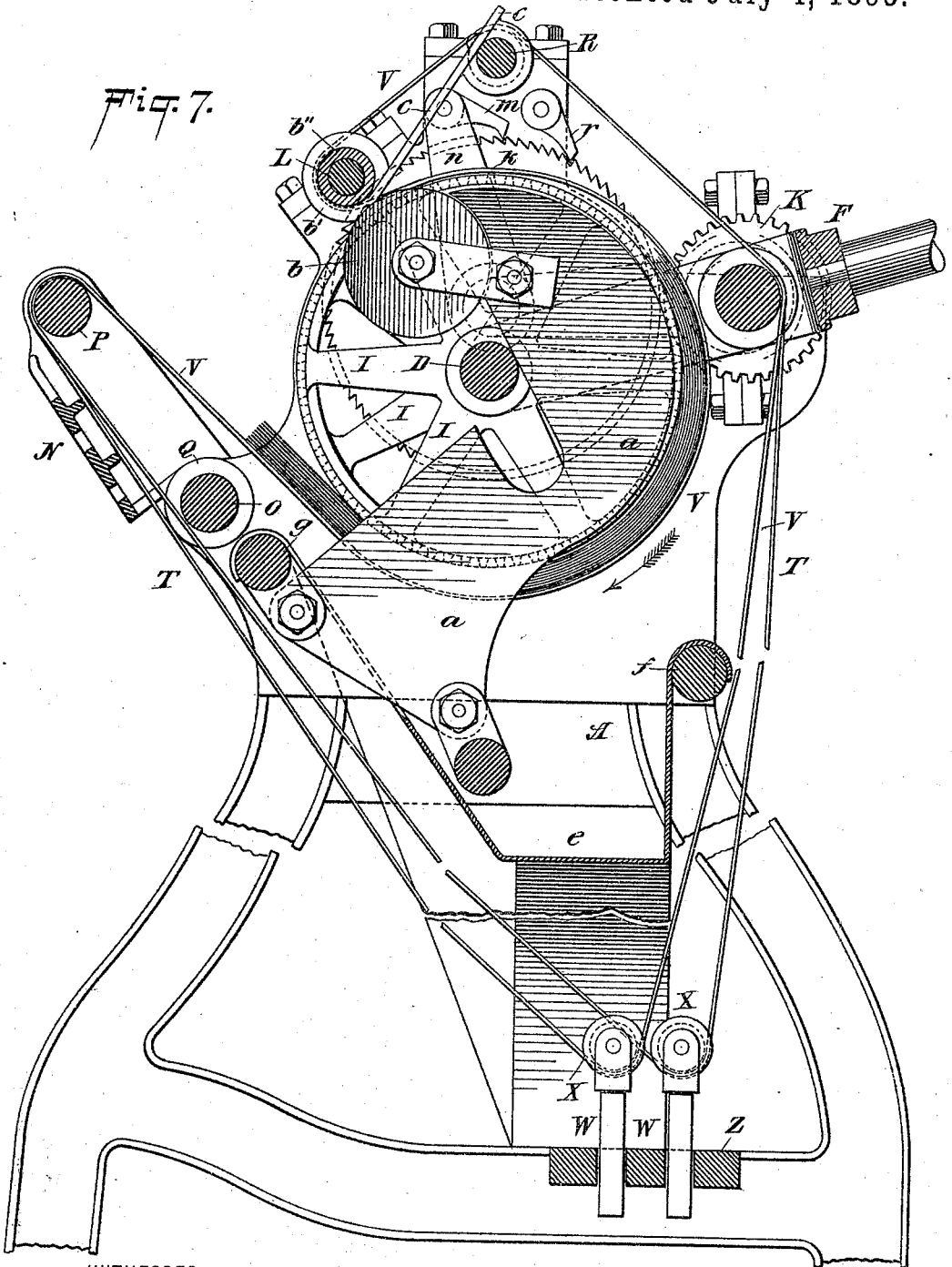

(No Model.) 7 Sheets—Sheet 6.

J. R. WILLIAMS.
TOBACCO STRIPPING AND BOOKING MACHINE.

No. 500,647. Patented July 4, 1893.

WITNESSES:
Wm Goebel.
Ed. D. Miller.

INVENTOR
John R. Williams,
BY
Chas. O. Gill
ATTORNEYS.

(No Model.) 7 Sheets—Sheet 7.

J. R. WILLIAMS.
TOBACCO STRIPPING AND BOOKING MACHINE.

No. 500,647. Patented July 4, 1893.

WITNESSES:
William Goebel.
Ed. D. Miller.

INVENTOR
John R. Williams,
BY
Chas. O. Gill
ATTORNEY

UNITED STATES PATENT OFFICE.

JOHN R. WILLIAMS, OF NEWARK, NEW JERSEY.

TOBACCO STRIPPING AND BOOKING MACHINE.

SPECIFICATION forming part of Letters Patent No. 500,647, dated July 4, 1893.

Application filed January 19, 1893. Serial No. 458,976. (No model.)

*To all whom it may concern:*

Be it known that I, JOHN R. WILLIAMS, a citizen of the United States, and a resident of Newark, in the county of Essex and State of New Jersey, have invented certain new and useful Improvements in Tobacco Stripping and Booking Machines, of which the following is a specification.

The invention relates to improvements in tobacco stripping and booking machines, and consists of the novel features of construction and combinations of parts hereinafter described and claimed.

Figure 1:
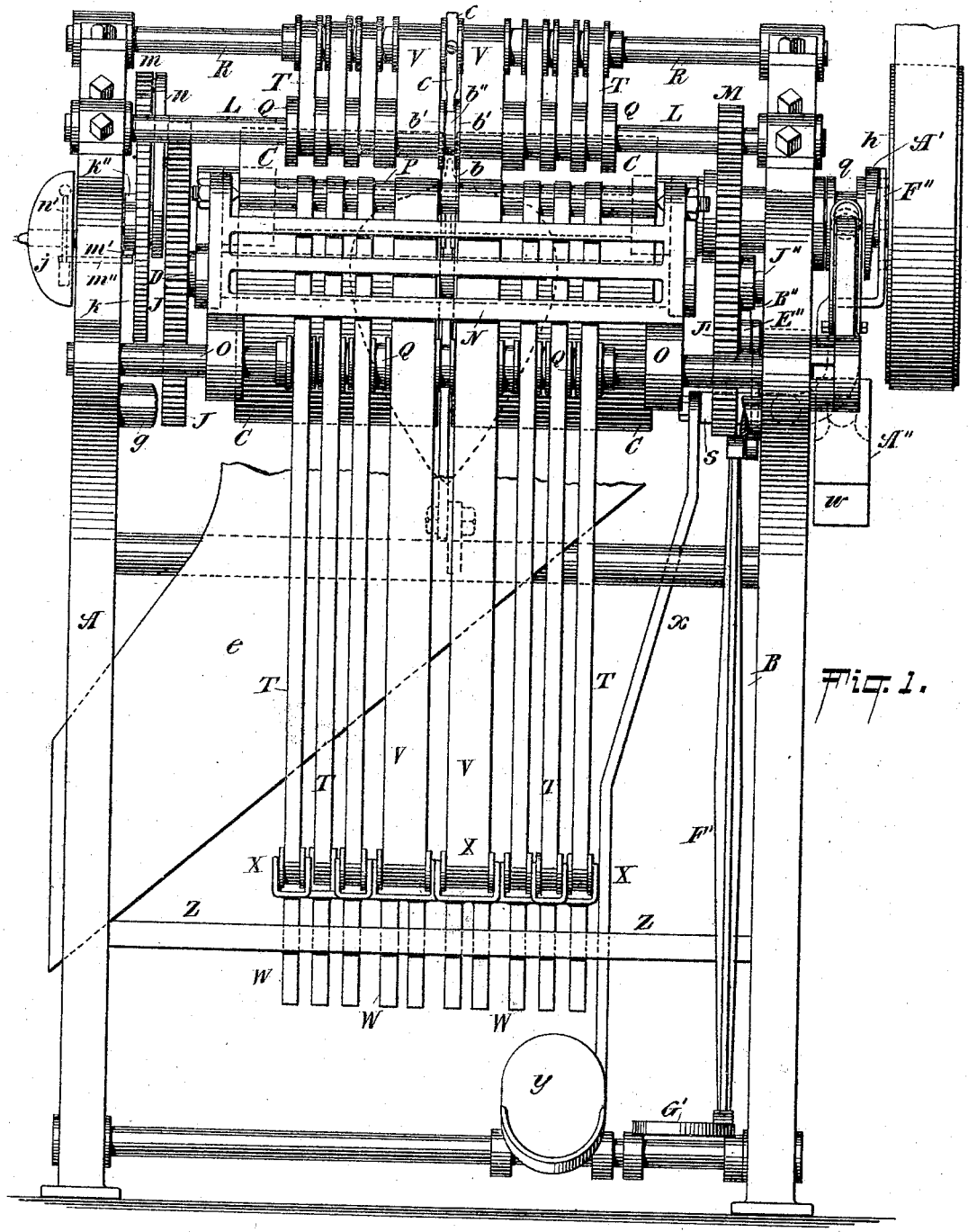
Figure 2:
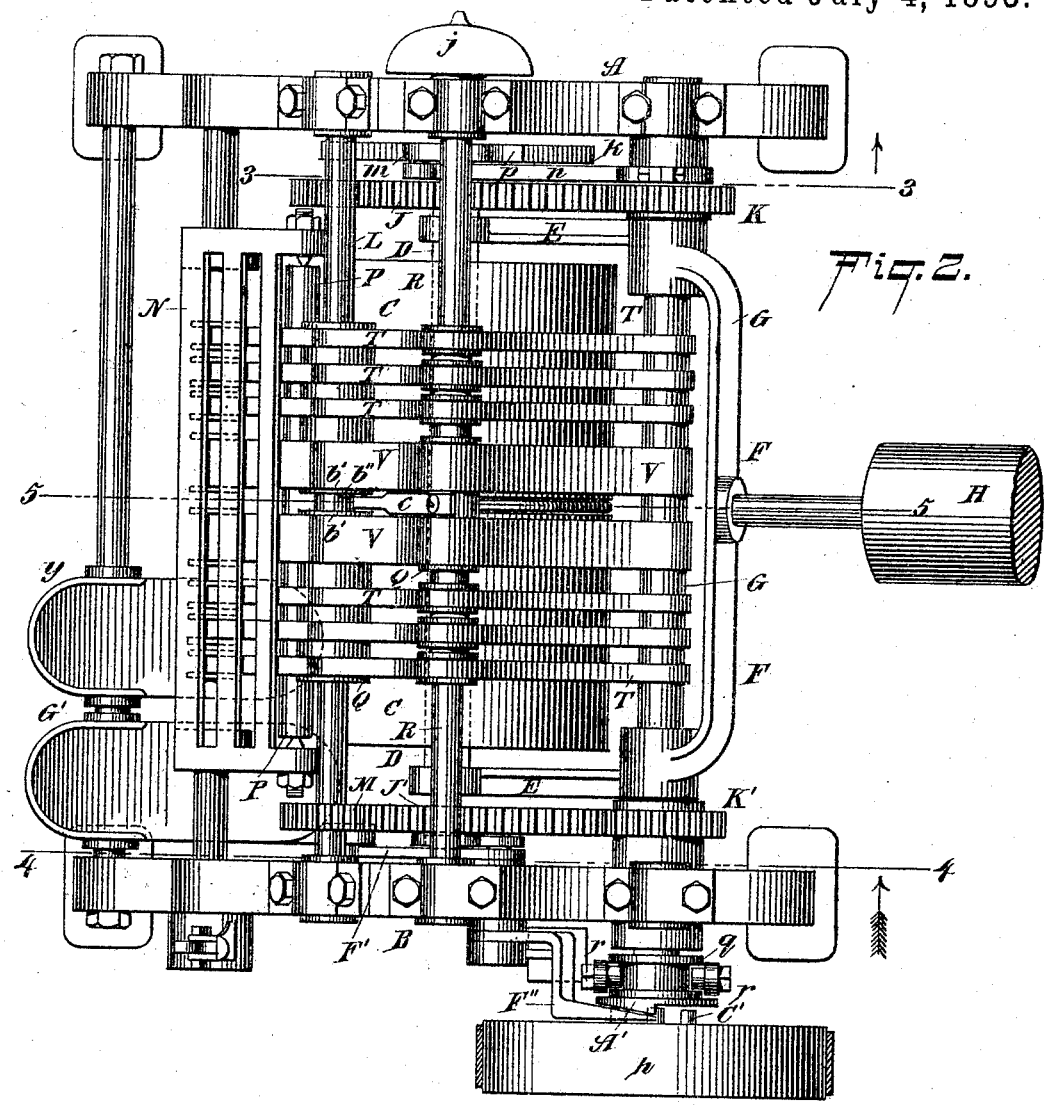
Figure 3:
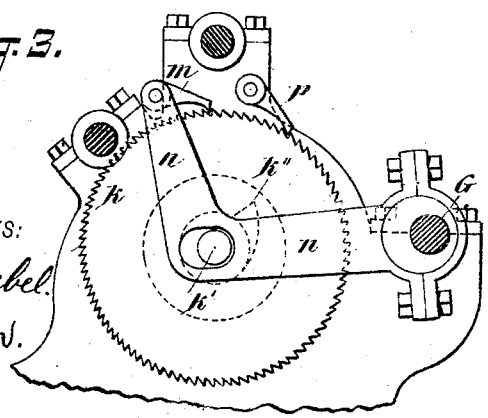
Figure 8:
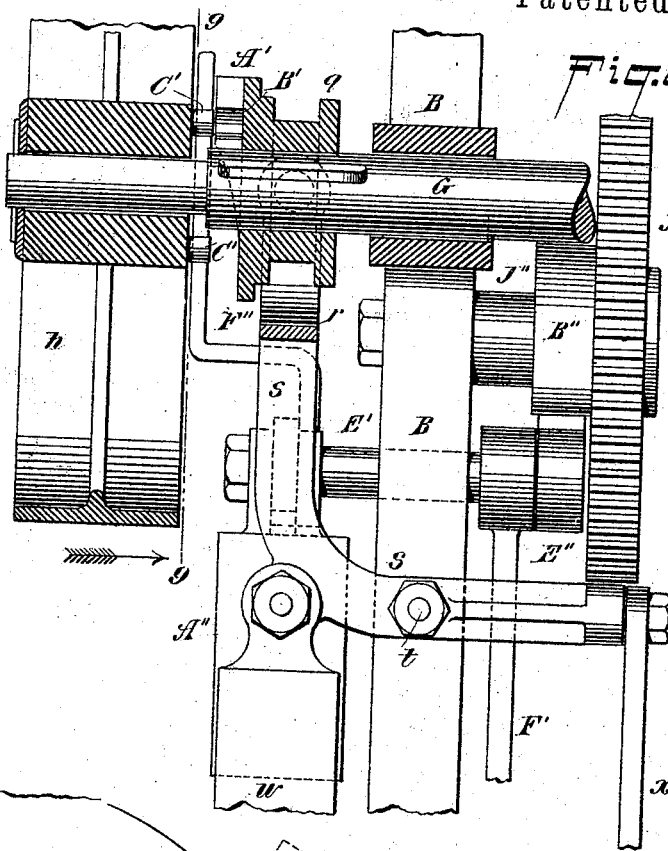
Figure 9:
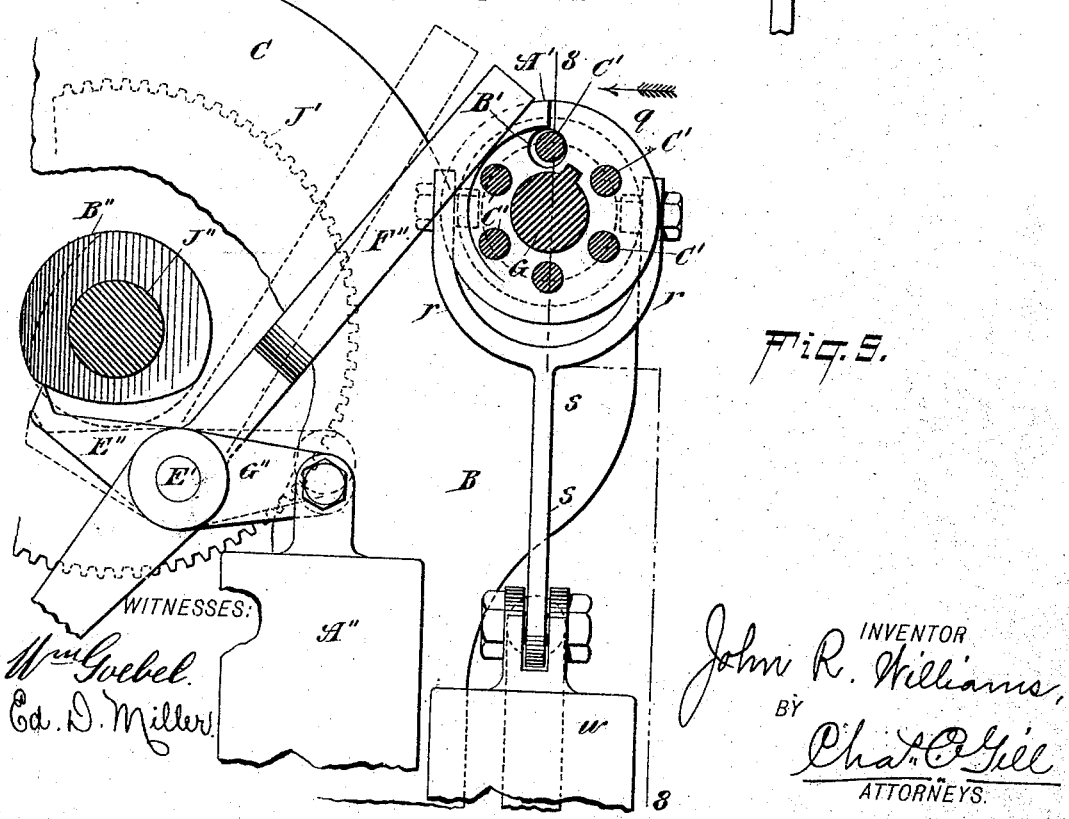
Figure 10:
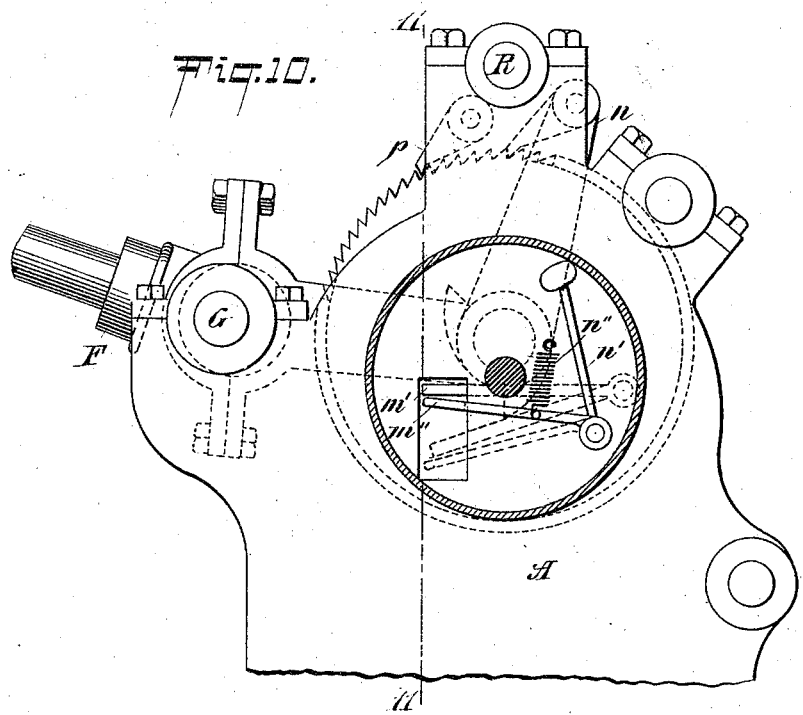
Figure 11:
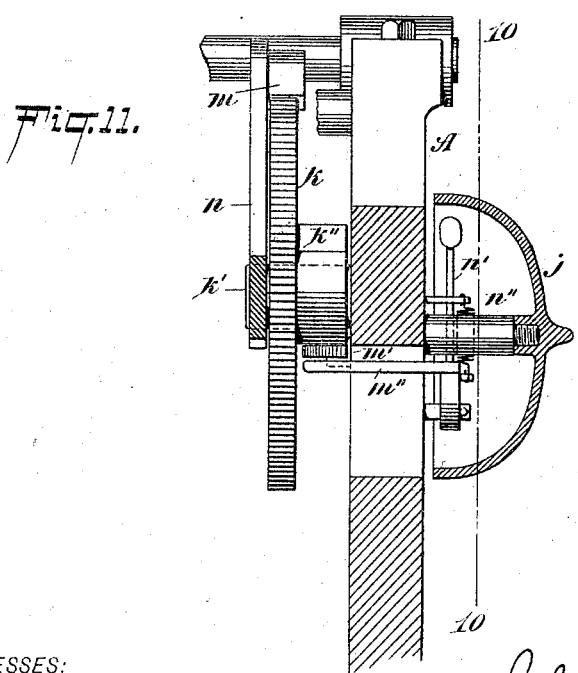

Referring to the accompanying drawings, Figure 1 is a front elevation, partly broken away, of a machine constructed in accordance with and embodying the invention. Fig. 2 is a top view of the same. Fig. 3 is a vertical section of the same on the dotted line 3—3 of Fig. 2 and looking in the direction of the arrow. Fig. 4 is a vertical section of same on the dotted line 4—4 of Fig. 2 and looking in the direction of the arrow. Fig. 5 is a vertical section of the same on an enlarged scale, on the dotted line 5—5 of Fig. 2. Fig. 6 is a detached sectional view of a portion of the machine on the dotted line 6—6 of Fig. 5. Fig. 7 is a similar section of the machine to that illustrated in Fig. 5 but showing the book of stripped leaves in position and the front hinged portion of the machine thrown open to permit the removal of the same, Fig. 5 illustrating the parts of the machine in position to strip and book the leaves, while Fig. 7 shows said parts and their relation to each other after sufficient of the leaves have been stripped to form the book. Fig. 8 is an enlarged detached view, partly in section on the dotted line 8—8 of Fig. 9, of the clutch mechanism connected with the driving shaft and by which the machine may be started and stopped at will. Fig. 9 is an enlarged detached view of the same, partly in section, on the dotted line 9—9 of Fig. 8. Fig. 10 is a vertical section, on the line 10—10 of Fig. 11, of a part of the machine and showing particularly the mechanism for sounding an alarm bell when the requisite number of leaves have been fed to the machine to form a book of the desired size, and Fig. 11 is a vertical section of the same on the dotted line 11—11 of Fig. 10.

In the drawings A, B respectively designate the opposite sides or frame of the machine, and C, C, the booking cylinders or drums which are mounted upon the shaft D, supported at its ends in the arms E, E, of the frame F, the latter being supported and adapted to oscillate upon the shaft G and being provided with the counterbalance weight H, whose tendency is to depress the outer portion of the frame F and hence to elevate the arms E, E, and the shaft D with the booking cylinders or drums C, C. The booking cylinders or drums C, C, have plain surfaces and contain the radial spokes I, extending outward from the hubs which inclose the shaft D. At the opposite sides of the machine are the spur gear wheels J, J', the former being mounted on the shaft D and the latter on a stud or short shaft J'' extending inward from the side frame B. The gear wheels J, J', are engaged by the pinion wheels K, K', mounted upon the opposite ends of the shaft G and receive their motion therefrom, the said shaft revolving within the collars forming a part of the frame F, but not in any manner affecting said frame.

At the front of the machine there is provided the shaft L carrying upon one end the pinion wheel M, which, as illustrated in Figs. 2 and 4, is engaged by and receives motion from the spur gear wheel J'; and below the shaft L there is provided the hinged table or section N, which consists of an open frame mounted upon the rod O and adapted to be moved thereon to its closed position, illustrated in Fig. 4, or to its open position, illustrated in Fig. 7. In the upper end of the frame N is mounted the shaft P; and upon the rod O are the grooved wheels Q, corresponding with similar grooved wheels on the shaft L and the rod R, extending between the sides A, B, of the machine. Upon the shaft L, rod R and shaft G, and upon the shaft P and rod O are the continuous belts lettered T, V, which at their lower portion hang below the operative mechanism of the machine and are drawn taut by the weights W, having pulleys X at their upper ends, upon which pulleys the belts T, V, pass. The belts T, V, are, as above described, continuous and extend upward from the rear side, for illustration, of the pulleys X (see Fig. 5) to the shaft G, thence passing over the grooved wheels on the rod R to and around the front and lower sides of the wheels on the shaft L, whence they pass around the cylinders or drums C, C, and upward over the shaft P, and then downward over the wheels Q on the rod O to the front of the aforesaid pulleys X, to the point of beginning. The belts T, V, are under a constant tension against the drums C, C, and have a traveling movement in the direction of the arrow (Fig. 7) and said belts collect and carry the stripped leaves around with the booking cylinders or drums C, C, until the book of the proper size is formed, whereupon a slight further movement of the belts and drums serves to leave the book in position to be withdrawn. The belts T, V, are kept under a uniform tension by means of the weights W, which are adapted to have a vertical movement under the action of the belts and are guided during the same by their passage through the vertical apertures in the transverse bar Z, connecting the sides A, B, of the machine.

It will be observed upon reference to Fig. 4, that the weights W, draw downward upon the belts T, V, and thus keep the upper portion of said belts close against the cylinders or drums C, C, and also against the shaft L, rod R, shaft G shaft P and rod O, or the wheels thereon receiving said belts.

Between the cylinders or drums C, C, there is secured the drum plate $a$, which prevents the tobacco stems from falling between the drums and supports between the upper part of the drums the grooved circular knife $b$, which co-operates at its opposite edges with the collars or auxiliary cutters $b'$, $b'$, secured on the shaft L to strip the stems from the tobacco leaves as the latter are fed inward one after another over the upper portion of the cylinders or drums, as indicated by dotted lines in Fig. 1. The opposite edges of the circular knife $b$ fit closely between the collars $b'$, $b'$, and between the periphery of the knife $b$ and the hub $b''$ of the collars $b'$, $b'$, is formed or left a space of sufficient dimensions to permit the passage through it of the stem, while the opposite side portions of the leaf are carried inward on the drums or cylinders C, C. In order that the stems cut from the tobacco leaves by means of the knife $b$, and co-operating or auxiliary cutters $b'$, $b'$, may not follow their natural tendency of winding around the hub $b''$, I have provided the arm $c$, which is secured to the rod R and extends downward as illustrated in Fig. 7 in close relation to the lower rear portion of the hub $b''$, in which position it will serve to deflect the stems of the tobacco leaves downward and rearward, causing them to pass over the edge of the drum plate $a$ and fall into the receptacle or chute $e$ conveniently located below the cylinders or drums C. The receptacle $e$ may be of any suitable and convenient construction and may be supported, if desired, from the rods $f$, $g$, connecting the sides A, B, of the machine. The drum plate $a$ is rigidly secured by bolts, as indicated in Fig. 7, and at its center is provided with an elongated slot or recess which permits the shaft D, passing through it, to have a definite oscillating movement under the action of the counterbalance weight H and the accumulation of stripped leaves, which during the operation of the machine are carried around the cylinders or drums supported on said shaft D.

In the operation of the machine the leaves are, as indicated by dotted lines in Fig. 1, fed to the upper side of the cylinders or drums C, C, the stem of the leaf being inserted between the periphery of the circular knife $b$ and the hub $b''$ connecting the collars or cutters $b'$, $b'$, and thereupon the said leaf owing to the rotation of the drums and the traveling movement of the belts T, V, is carried inward between the said belts and the said drums, one-half of the leaf being upon one cylinder or drum and the other half thereof upon the other cylinder or drum, while during the inward travel of the leaf its stem is cut or stripped and moved over the edge of the drum plate $a$ until it is left unsupported and falls into the receptacle $e$. The drums or cylinders C, C, receive their revolving motion from their shaft D, which receives its motion from the belt wheel $h$, shaft G, pinion wheel K, and spur gear wheel J, the latter as above described being mounted upon the end of the said shaft D. During the revolving motion of the cylinders or drums C, C, the motion from the belt wheel $h$, is also communicated through the shaft G, pinion wheel K' and gear wheel J' to the pinion wheel M, secured upon the shaft L. Thus the collars $b'$, $b'$, are given a revolving motion and being in engagement with the edges of the circular knife $b$, the latter is given its proper motion for the purpose of effectually cutting or stripping the stem from the leaves. After a suitable number of leaves have been stripped to form a book, the hinged section N at the front of the machine is thrown outward to its open position, as shown in Fig. 7, and thus the book of leaves is exposed and may be readily withdrawn from the machine. After the book of leaves has been withdrawn from the machine the hinged section N may be closed to its position illustrated in Fig. 5 and the operation of stripping the leaves continued for the purpose of forming another book thereof.

The machine is provided with clutch mechanism hereinafter particularly described by which the machine may be stopped and started at will and which will automatically cause the drums or cylinders C, C, to stop at the end of every revolution of the same. The drums or cylinders C, C, will thus perform one complete revolution carrying the two halves of the leaf completely through the machine and back to the point at which the leaf was fed, and hence as each succeeding leaf is fed to the machine, it will be placed upon the preceding one, the feeding of the leaves at the end of each revolution of the drums being continued until a book (shown in Fig. 7) of the desired thickness has been formed. As the gradually accumulating leaves, forming a book of increasing thickness, are carried by the drums or cylinders C, C, the latter upon the passage of said leaves beneath the shaft L are depressed or given an oscillating movement downward with the shaft D; after the accumulated thickness of stripped leaves passes inward beyond the shaft L, the counterbalance weight H serves to return the drums or cylinders C, C, to their upward position and during the travel of the book of leaves around the cylinders or drums C, C, the traveling belts T, V, yield to the thickness of the leaves, as illustrated in Fig. 7, the weight W, at such time being by the shortening of the suspended portion of the belts drawn upward through the apertures in the transverse guide bar Z. Thus it will be apparent that with the feeding inward of each additional leaf to the book, the depression of the drums or cylinders C, C, and the yielding of the belts T, V, will increase until the book of the desired size has been formed and withdrawn, but it is to be noted that during the depression of the drums and the yielding of the belts, the relation of the circular knife $b$ with the coöperating collars or cutters $b'$, $b'$, does not vary.

It may be found desirable in order to insure the formation of books containing a uniform number of leaves, to provide on the machine an alarm, which after a predetermined number of leaves have been stripped will sound and notify the attendant that the required number of leaves for the book have been stripped; and for the purpose of accomplishing this result I provide on one side of the machine a bell $j$ and the ratchet $k$, the latter being mounted on an axle and adapted to be revolved by a pawl $m$ carried upon the end of the eccentric rod $n$, which latter is given its reciprocating motion from the shaft G, as illustrated in Figs. 2 and 3. The reciprocation of the rod $n$ serves to rotate the ratchet wheel $k$ and its axle $k'$ a definite distance, and upon the axle $k'$ is mounted the cam $k''$ which upon performing a full revolution under the action of the pawl $m$ and wheel $k$ operates through connecting mechanism to sound the alarm. The ratchet wheel $k$ is also provided with the dog $p$, which prevents any backward movement in the ratchet wheel while the pawl $m$ is moving over the teeth of the latter to re-engage the same for the succeeding thrust of the rod $n$.

I do not wish to confine myself to any special mechanism intermediate the ratchet wheel $k$, and the hammer of the bell $j$, but for purposes of completeness I have illustrated in the drawings an arm $m'$ (see Figs. 10 and 11) which remains in close contact with the cam $k''$ and with every revolution of said cam is depressed against the arm $m''$ connected with the hammer rod $n'$ which has a spring tension upward toward the bell by reason of the coiled spring $n''$. During the revolution of the ratchet wheel $k$, the projecting portion of the cam $k''$ will through the arm $m'$ depress the arm $m''$ and extend the coiled spring $n''$, and after the projecting portion of the cam $k''$ has passed beyond the arm $m'$ the spring $n''$ will draw the arm $m''$ quickly upward, restoring the arm $m'$ to its position against the cam and causing the hammer to strike the bell, thereby sounding the alarm.

The number of teeth in the ratchet $k$ and the extent of the throw of the pawl $m$ will be governed by the number of leaves it is desired shall constitute a book, and in a machine in which, for example, it is desired that fifty leaves shall constitute a book and the driving pinion K performs three revolutions to one of the gear wheel J mounted on the drum shaft D, it will be found desirable to have one hundred and fifty-three teeth in the said ratchet $k$ and to allow with each revolution of the drums C, C, a throw for the pawl $m$ equal to three of the teeth of the ratchet $k$ for the reason that the driving shaft G will perform one hundred and fifty revolutions to every fifty revolutions of the cylinders or drums C, C. With every revolution of the drums or cylinders C, C, the ratchet wheel $k$ is rotated to the extent of three of its teeth. Hence with every fifty revolutions of the drums C, C, feeding in fifty leaves, the ratchet wheel $k$ will be caused to perform one complete revolution less a movement equal to three of its teeth, or turn to the extent of one hundred and fifty of its teeth, at which time the cam $k''$ through the intermediate mechanism will sound the alarm and the attendant will cease to feed inward the leaves, having been apprised by the alarm that the proper quantity of leaves had already been fed to the machine to form the book. At this time the hinged section N, at the front of the machine will be thrown open to the position illustrated in Fig. 7 and the cylinders or drums C, C, allowed to perform one revolution, which will have the effect of moving the book of leaves outward to the section N in position to permit its ready removal. This last revolution of the cylinders or drums C, C is performed while the ratchet wheel $k$ moves onward to the extent of three of its teeth and completes its revolution, having then revolved to an extent equal to the one hundred and fifty-three teeth cut in its edge. The last movement, of the three teeth, in the ratchet $k$ resets or brings to position the cam $k''$ preparatory to the further operation of the machine, and hence the said last movement in the ratchet $k$ has no effect looking to the sounding of the alarm or the counting of the leaves for the book. The movement of the ratchet $k$ in its stages of three teeth each for fifty movements, comprises the one hundred and fifty teeth which are utilized in the mechanism for ringing the bell, while the extra three teeth making one hundred and fifty-three teeth in all are simply employed during the last revolution of the cylinders or drums C, C, to discharge the book and reset the cam k″ for the succeeding operation of forming a further book.

The clutch mechanism above referred to is illustrated more fully in Figs. 1, 2, 8 and 9, and its construction is such that the motion of the drums C, C, is stopped automatically at the end of each revolution, that by pressure applied to one foot treadle the drums C, C, may be again set in motion to perform another revolution, and that by pressure applied to another foot treadle the motion of the drums C, C, may be stopped at any time whether they have completed a revolution or not. Upon referring to Figs. 1, 2, 8, and 9, it will be observed that upon the end of the driving shaft G is provided the grooved sliding wheel $q$, which is engaged at opposite sides by the bifurcated arms $r$ of the bell-crank lever $s$, the latter being pivotally secured at $t$ to the frame B and carrying the suspended weight $w$. The lower arm of the bell crank lever $s$ is connected by a pitman-rod $x$ with the foot treadle $y$. The object of the weight $w$ is to keep the wheel $q$ under a normal tension toward the belt-wheel $h$, and thus to effect the movement of the wheel $q$ toward the belt wheel $h$ as soon as the foot is released from the treadle $y$. By pressure applied on the foot treadle $y$ the force of the weight $w$ is overcome and the forked arms $r$ and wheel $q$ are moved toward the side frame B, thus freeing or disengaging the clutch and stopping the operation of the machine. The foot treadle $y$ will be used in case it may be desired to stop the machine suddenly, as in the event of an accident; and by means of the treadle $y$ and bell-crank lever $s$ the machine may be stopped at any point whether or not the drums C, C, have completed their revolution.

Upon one side of the clutch wheel $q$ is formed the inclined cam A′ having the pocket B′ adapted to engage one of the series of pins C′ extending outward from the hub of the belt wheel $h$. When the clutch wheel $q$ is permitted to move against the wheel $h$ one of the pins C′ will quickly enter the pocket B′ and thus establish a connection between the belt wheel and clutch wheel, with the result that the motion of the belt wheel will be imparted to the shaft G and through it to the pinions and gearing hereinbefore described. As above described the force of the weight $w$ is exerted to give the clutch wheel $q$ a normal tension toward the band wheel $h$ and if desired this tension may be increased by means of a spring D′ intermediate the treadle $y$ and rod $x$, as shown in Fig. 4.

In a convenient position in the frame B is mounted the rock-shaft E′, to which is connected the pitman rod F′ of the treadle G′, and on which rock-shaft is secured the dog E″ the arm or lever F″, and the arm G″, from which the weight A″ is suspended. The effect of the weight A″ is to keep the upper end of the arm or lever F″ normally between the hub of the wheel $h$ and the cam A′ on the clutch wheel $q$, as shown by full lines in Fig. 9, and the purpose of the foot treadle G′ is to throw the upper end of said arm or lever F″ outward to the position shown by dotted lines in Fig. 9 in order that the clutch wheel $q$ may be engaged by one of the pins C′ and the machine set in motion. In order that the arm or lever F″ may be prevented from wedging between the wheel $h$ and clutch wheel $q$ and stopping the machine except at the proper time, there is provided on the gear wheel J′ a cam B″ which engages the dog E″ and by acting through the same on the rock-shaft E′ keeps the arm F″ in its outward position, shown by dotted lines in Fig. 9, until at the end of each revolution of the wheel J′ the flattened surface of the cam reaches the dog E″ and permits the weight A″ to turn the arm or lever F″ inward, as shown by full lines, for the purpose of stopping the machine. The wheel J′ and drums C, C, revolve simultaneously, and hence since the cam B″ at each revolution permits the weight A″ to move the arm F″ inward and disengage the clutch wheel $q$ it is plain that the drums will come to a stop at the end of each revolution. At the end of each revolution of the drums C, C the machine is started in motion again by the attendant pressing his foot on the treadle G′, this having the effect of turning the rock-shaft E′ to throw the arm F″ outward and permitting the wheel $q$, under the action of the weight $w$, to move toward and re-engage the wheel $h$. Hence, at the end of each revolution of the drums C, C, the weight A″ will cause the arm F″ to disengage the clutch wheel $q$, and the foot treadle G′ will be used to restart the machine; and if at any time it might be desired to stop the machine suddenly or before the drums C, C, have completed their revolution the treadle $y$ will be used to instantly draw the wheel $q$ from the band wheel. The cam A′ has a tapered surface and the edge of the arm F‴ is tapered, the purpose being to facilitate the entrance of the arm between the clutch wheel $q$ and band wheel $h$. While the drums C, C, are performing their revolution, the tobacco leaf is carried inward and its stem removed, as above described, and since the drums come to a full stop at the end of each revolution it will be found convenient to feed the leaves to the machine so that an additional leaf will be carried inward at each revolution of the drums.

I do not wish to confine myself to any special number of the belts on the drums C, C, but it will be essential to employ at least two belts, one being on each drum. Where a number of the belts are used on each drum it will be found that the belts may be lighter and so distributed as to effectually support the book of leaves.

What I claim as my invention, and desire to secure by Letters Patent, is—

1. In a tobacco stripping and booking machine the cylinders or drums and the oscillatory frame carrying the shaft of said drums, combined with the revolving cutters, and the endless belts extending around said drums to the point at which the leaves are fed inward and thence turning in a reverse direction to means for keeping them taut; substantially as set forth.

2. In a tobacco stripping and booking machine the cylinders or drums mounted on a shaft having a yielding support, combined with the revolving cutters, the endless belts extending around said drums to the point at which the leaves are fed inward and thence turning in a reverse direction and hanging downward, and the weighted pulleys suspended by said belts; substantially as set forth.

3. In a tobacco stripping and booking machine, the cylinders or drums mounted on a shaft having a yielding support, and the weight to keep the said drums normally upward, combined with the revolving cutters and the endless belts extending around said drums to the point at which the leaves are fed inward and thence turning in a reverse direction to yielding pulleys; substantially as set forth.

4. In a tobacco stripping and booking machine, the cylinders or drums, the oscillatory frame carrying the shaft of said drums and having a tension upward, and the gear wheel on said shaft, combined with the revolving cutters, the driving shaft carrying a pinion in engagement with said gear wheel, and the endless belts extending around said drums to the point at which the leaves are fed inward and thence turning in a reverse direction to means for keeping the belts taut; substantially as set forth.

5. In a tobacco stripping and booking machine, the cylinders or drums, the oscillatory frame carrying the shaft of said drums and having a tension upward, and the gear wheel on said shaft, combined with the revolving cutter mounted between the drums, the shaft having the cutters or collars engaging said revolving cutter, the pinion on said shaft, the gear wheel independent of the drums and engaging said pinion, the driving shaft having pinions in engagement with said gear wheels, and the endless belts extending around said drums to the point at which the leaves are fed inward and thence turning in a reverse direction to sustaining pulleys; substantially as set forth.

6. In a tobacco stripping and booking machine, the cylinders or drums, the revolving cutters and the hinged section in the frame of the machine, combined with the endless belts extending around said drums to the point at which the leaves are fed inward and thence turning in a reverse direction to sustaining pulleys, one part of the belts returning over the top of said hinged section, and the other part over pulleys located above said drums; substantially as set forth.

7. In a tobacco stripping and booking machine, the cylinders or drums C, C, and the revolving cutters $b$ and $b'$, the former being located between the drums and the latter above said drums, combined with the shaft L above and toward the front of the drums and carrying the cutters $b'$, the rod R extending between the sides of the machine and about centrally over the drums, the shaft G in rear of the drums, the shaft P in front of the drums at the point at which the leaves are fed inward, the rod O below said shaft P, the endless belts passing around said drums and thence turning in a reverse direction over said shafts and rods, and the weighted pulleys suspended on said belts; substantially as set forth.

8. In a tobacco stripping and booking machine, the cylinders or drums C, C, and the drum-plate $a$ located between the same, combined with the revolving cutters $b$ and $b'$ located respectively between and over said drums, the arm $c$ extending downward at an angle to the hub between the cutters $b'$ and serving to deflect the stems over the upper edges of the drum plate, the endless belts extending around said drums to the point at which the leaves are fed inward and thence turning in a reverse direction, and the weighted pulleys suspended on said belts; substantially as set forth.

Signed at New York, in the county of New York and State of New York, this 14th day of January, A. D. 1893.

JOHN R. WILLIAMS.

Witnesses:
 CHAS. C. GILL,
 ED. D. MILLER.